W. G. ADAMS.
HEADER BARGE ATTACHMENT.
APPLICATION FILED JULY 18, 1917.

1,277,346.

Patented Sept. 3, 1918.
2 SHEETS—SHEET 1.

WITNESSES

INVENTOR
W. G. Adams
BY Victor J. Evans
ATTORNEY

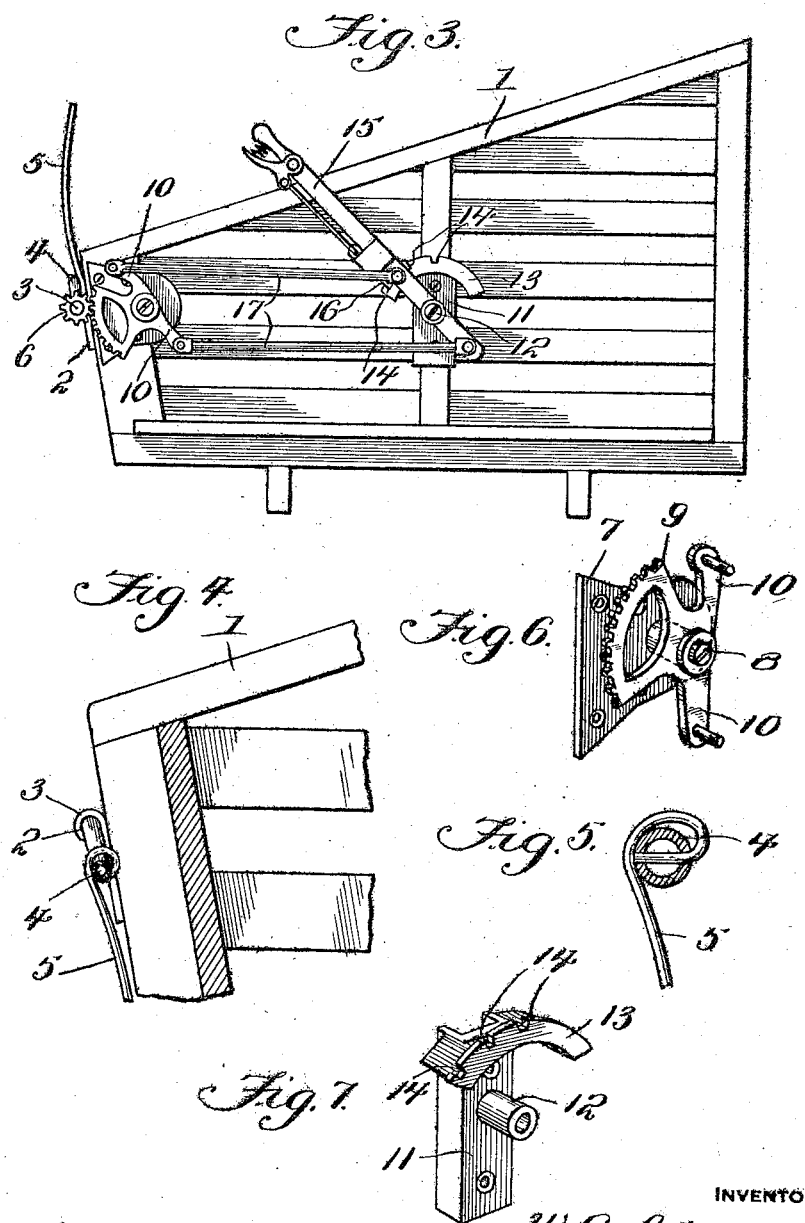

UNITED STATES PATENT OFFICE.

WILLIE G. ADAMS, OF CASSVILLE, MISSOURI.

HEADER-BARGE ATTACHMENT.

1,277,346.  Specification of Letters Patent.  Patented Sept. 3, 1918.

Application filed July 18, 1917. Serial No. 181,375.

*To all whom it may concern:*

Be it known that I, WILLIE G. ADAMS, a citizen of the United States, residing at Cassville, in the county of Barry and State of Missouri, have invented new and useful Improvements in Header - Barge Attachments, of which the following is a specification.

This invention relates to a header barge attachment adapted to be applied to a farm wagon and it consists in the novel features hereinafter described and claimed.

In the harvesting of grain the same is generally delivered from the header harvester for transportation from the place of harvesting to a suitable place to be stacked. These barges generally have a lower side which is disposed adjacent the harvester elevator so that the wheat or grain may be delivered directly from the header harvester to the barge. Often times the wheat or grain slides off the lower side of the barge and is wasted in the field at the point of loading the barge, that is, before the barge is moved out of coöperation with the header harvester.

It is therefore one object of the present invention to provide an attachment which may be easily, economically and readily applied to the lower side of the barge for movement out of the way of the header harvester when the barge is being filled with grain, and movable into operative positions over the top of the lower side of the barge when the latter is withdrawn from the header harvester, so as to prevent accidental dropping of the heads of grain from the barge as the latter is being transported from the header harvester to the stack, and which, when the place of stacking is reached, may be easily shifted so that all grain which has been saved from falling out of the barge may be dropped at the stacking place within handy reach of the stacker and thereby saved.

Another object of the invention resides in the provision of means for connecting with the lower side of the header barge to prevent wasting of the grain as the grain is carried in the barge from one place to another.

In the accompanying drawings:—

Fig. 3 is a similar view showing the parts in a different position.

Fig. 4 is a fragmentary sectional view of an edge portion of the barge.

Fig. 5 is a transverse sectional view of a shaft used on the barge.

Fig. 6 is a perspective view of a plate and attached parts used on the barge.

Fig. 7 is a similar view of another plate and attached parts used on the barge.

Figure 1:
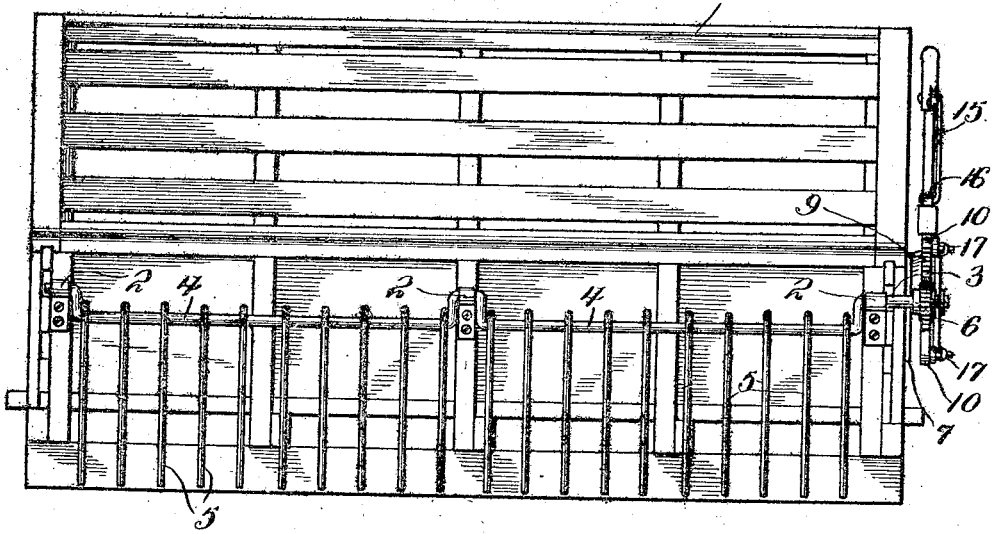
Figure 1 is a side view of the barge.
Figure 2:
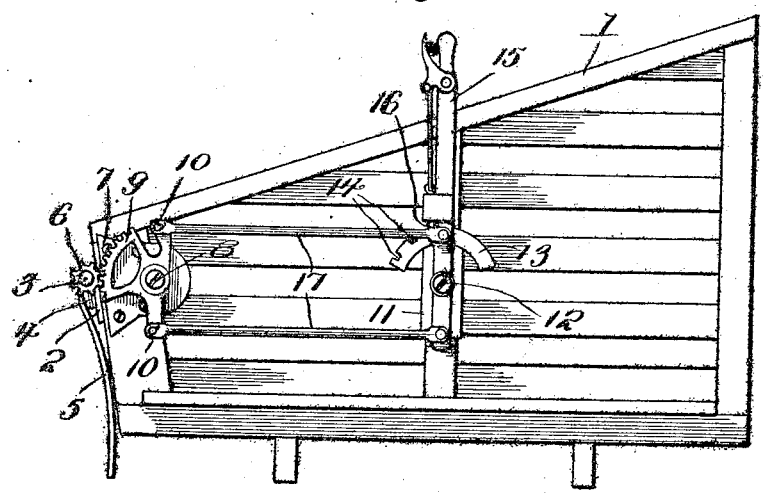
Fig. 2 is an end view of the same.

Referring more particularly to the accompanying drawings, the reference character 1 indicates a barge body of any common construction of that type wherein there is a lower side over which the grain or other material is slid into the barge from a header harvester or otherwise.

Bearings 2 are mounted at the shorter side of the barge body below the edge thereof and a shaft 3 is journaled in the said bearings. The shaft 3 is provided at points between the bearings 2 with crank sections 4 and tines 5 of resilient metal are carried by the said crank sections. The upper end of the tines 5 are passed transversely through the crank sections 4 and then the tines are curved over the said crank sections and extended in a downward direction therefrom. A gear wheel 6 is mounted upon one end of the shaft 3. A plate 7 is mounted at one end of the barge body 1 and a stud 8 is mounted upon the said plate. A gear segment 9 is journaled upon the stud 8 and the teeth of the said segment 9 mesh with the teeth of the gear wheel 6. The segment 9 is provided with oppositely disposed arms 10 which are located at the opposite sides of the stud 8.

A plate 11 is also mounted at the end of the barge body 1 and supports a stud 12 and a segment 13. The segment 13 is provided at its upper edge with a series of notches 14. A lever 15 is fulcrumed upon the stud 12 and carries a spring pressed pawl 16 which is adapted to engage in any one of the notches 14 whereby the lever 15 is held at an adjusted position with relation to the plate 11. Rods 17 are pivotally connected at their outer ends with the outer end of the arms 10 and the inner ends of the rods 17 are pivotally connected with the lever 14 at points beyond the opposite sides of the stud 12 upon which the said lever is fulcrumed.

From the foregoing description taken in conjunction with the accompanying drawings, it will be seen that when the upper end of the lever 15 is swung away from the shorter side of the barge body, the rods 17 are moved longitudinally whereby the segment 9 is swung upon its supporting stud 8 and through the gear wheel 6 the shaft 3 is turned so that the tines 5 are downwardly disposed. When the parts are in these positions it will be observed that the crank sections 4 of the shaft 3 are positioned at a considerable distance below the upper edge of the shorter side of the barge body and hence the said shaft is out of the way and will not interfere with the loading of the material into the barge body.

When the upper end of the lever 15 is swung toward the shorter side of the barge body 1 the parts hereinbefore mentioned are again moved whereby the crank sections 4 of the shaft 3 are swung up toward the upper edge of the shorter side of the barge body and the tines 5 are projected above the upper edge of the shorter side of the barge body and consequently the material which has been loaded into the barge body is prevented from falling from the same, by the tines, over the upper edge of the shorter side of the barge body.

Thus it will be seen that a barge of simple and durable structure is provided and that the parts thereof are readily manipulated to prevent waste of material therefrom while the barge is in transit and these parts may also be moved so that they will be out of the way while the barge is being loaded with the said material.

Having described the invention what is claimed is:—

1. A header barge attachment comprising a body, bearings mounted thereon, a shaft journaled in the bearings, means for turning the shaft, said shaft having at points between the bearings crank sections and tines carried by the crank sections of the shaft.

2. A barge attachment comprising a body, a shaft journaled thereon, tines carried by the shaft, a gear wheel fixed to the shaft, a gear segment pivoted upon the body and having teeth which mesh with the said gear wheel, said segment being provided with arms which extend in opposite directions, and which are located at the opposite sides of the pivot of the segment, a lever fulcrumed upon the body, means for securing the lever at an adjusted position and rods pivotally connected with the lever at the opposite sides of its fulcrum point, said rods being pivotally connected with the outer portions of the said arms.

In testimony whereof I affix my signature.

WILLIE G. ADAMS.

Copies of this patent may be obtained for five cents each, by addressing the "Commissioner of Patents, Washington, D. C."